Sept. 28, 1937.        C. L. COLBERT        2,093,998
METHOD OF MAKING GRANULES
Filed April 21, 1932
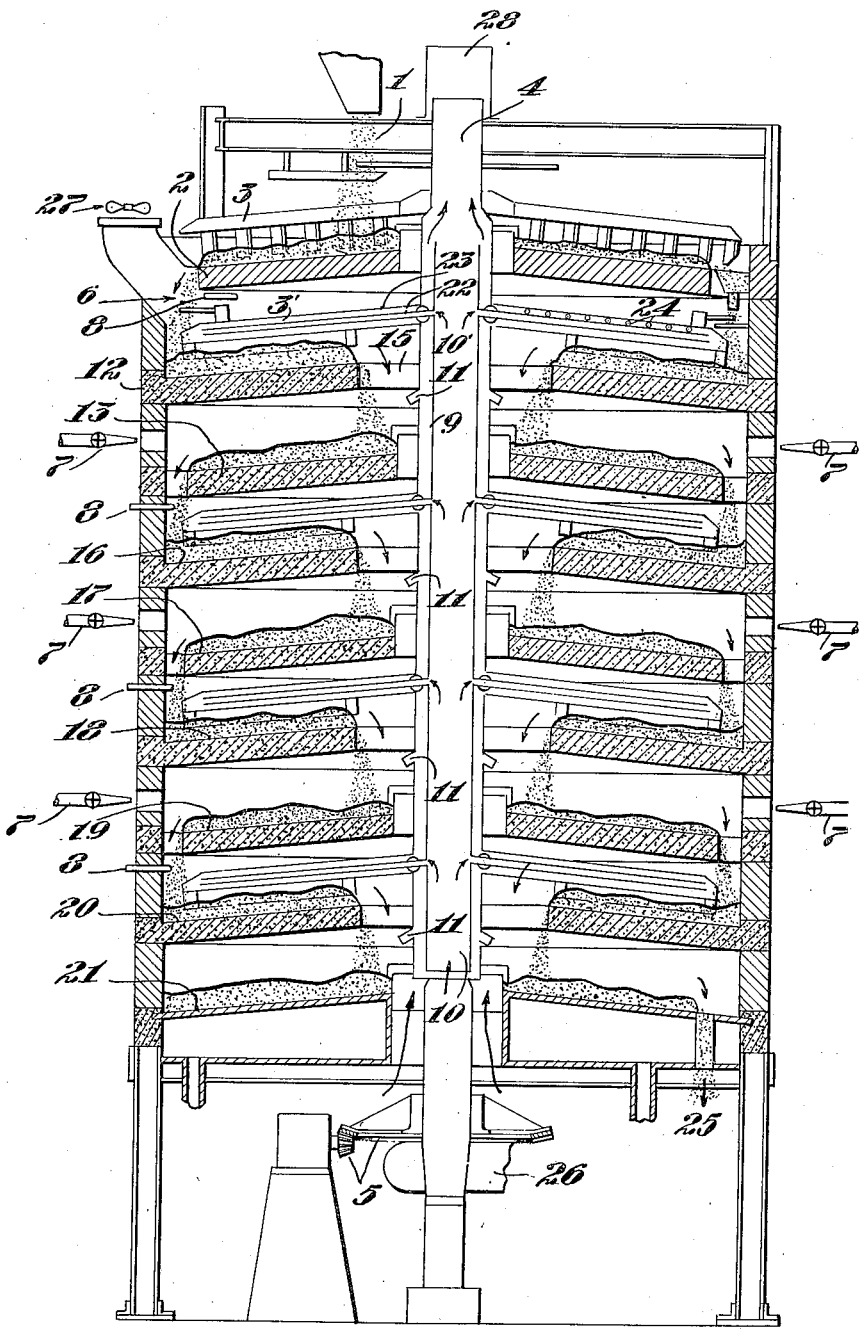
Inventor
Clarence L. Colbert
by Roberts, Cushman & Woodberg
Attys.

Patented Sept. 28, 1937

2,093,998

UNITED STATES PATENT OFFICE 2,093,998

METHOD OF MAKING GRANULES

Clarence L. Colbert, Elizabeth, N. J., assignor, by mesne assignments, to Empire Trust Company, New York, N. Y., a corporation of New York, as trustee Application April 21, 1932, Serial No. 606,753

10 Claims. (Cl. 91—70)

This invention relates to granular material, for embedding in cementitious surfaces such as shingles and like purposes, and to a method of making the same.

In the manufacture of roofing shingles of cementitious nature, such as Portland cement or asphalt, it is customary to apply to the surface a coating of granular material. Crushed slate has been commonly used in this way. This material is applied for the purpose of protecting and improving the roofing surface, and to this end it is desirable that it should have three qualifications; first, that it shall adhere to the cementitious surface for a long period of time; secondly, that it shall resist for a long time the varying conditions of weather; and, thirdly, that it may be capable of permanently imparting to the surface a decorative or coloring effect.

Numerous materials have been used for this purpose such as crushed slate, crushed mineral matter, and crushed ceramic ware, such as brick and the like.

It is, however, a common characteristic of these materials that they may serve one or perhaps two of the above qualifications but not all three of them to a thoroughly satisfactory degree. One disadvantage of materials heretofore used has been the high cost of the raw materials or of the finished granular product, and a further difficulty has been encountered in the production of such materials with sufficient uniformity in their characteristics, such as color, hardness and the like.

For example, it has been practiced to crush certain laminated materials, such as pyrophilite, to granular form and then heat the granules to a sufficient temperature to vitrify their surfaces. One advantage of this product is that the resulting granules are flat and consequently possess an effective covering power. Their vitrified surfaces, however, are smooth and hence not well adapted to adhere to a cementitious shingle surface.

It has also been proposed to crush argillaceous materials, such as hard compacted fire-clay and shale, and then to size the crushed material and heat the sized granules to a sufficient temperature to harden the same (without fusion) so as to provide a granule of angular shape corresponding to the natural fracture of the raw material, and also with a comparatively rough surface to which the cementitious material of the shingle will firmly adhere. It has also been proposed to color such materials by treating with certain inorganic salts which by subsequent heat treatment are decomposed to produce an adherent colored surface. It has further been proposed that such granules may be provided with a further adherent coating of finer particles of the same material, such as dust, which will adhere to the granular surface upon heating to a sufficient temperature. It is found, however, that for this purpose relatively high temperatures are required, and that they involve relatively high costs for fuel and furnace repairs. It is also found that the adhering dust to some extent tends to dilute the coloring effect of any coloring matter which may be added to the granule or of the body material of the granule itself. The latter difficulty may be overcome to some extent by a preliminary washing of the raw granule, but such operations involve not only the consumption of a large volume of water but the expense (which is usually prohibitive) of subsequently drying the granules before subjecting to hardening temperatures.

It is accordingly an object of this invention to provide granular materials, having the desirable properties outlined above, from relatively inexpensive raw materials, and a method of producing the same whereby the qualities of the resulting product may be definitely controlled and maintained with uniformity. Other objects will appear from the following description.

In accordance with the present invention, it is found that hard, compacted argillaceous materials, such as fire-clay and shale, are suitable as a raw material and also capable of producing a highly satisfactory product. The raw material is first crushed and sized to the desired size or range of sizes which may be washed if this is considered practicable, but need not be washed. The granules are then given a very superficial but uniform surface treatment with a reagent, preferably in solution or aqueous dispersion, which is characterized by being reactive upon the surfaces of the granules and/or adherent dust particles, to reduce the softening point of such material upon being subjected to heat. Such reagent may be termed a flux, but it is to be understood that it is so limited in its fluxing activity toward the granule surface or in the relative amount in which it is used that it will be inadequate to liquefy the granule surface, at least under the temperature conditions contemplated, appreciably to modify the characteristic structure of the surface, as for example by causing the surface to flow together into a continuous film, or to undergo surface deformation. In other words, in accordance with this invention, the surfaces of the granules are reacted upon to lower their softening temperatures, in situ, and are still retained in their original condition and distribution over the granules without confluence to produce even superficial continuity. This result may be conveniently effected by treating the granules with a solution, including colloidal solutions or suspensions of the reagent in suitable dilution or dispersion, and thereafter drying the granules either before or in the course of subjecting them to the higher temperatures of heat treatment. In such drying, the liquid vehicle (which need not be present in large quantities) is evaporated and the reagent deposited upon the granular surfaces. Though the coating thus formed is characteristically thin and even discontinuous, the reagent may thereafter become further comminuted due to the dehydration and decrepitation or shrinkage of the reagent deposit.

The granules as thus treated, with the fluxing reagent dispersed thereon (and with or without adherent dust particles), are next subjected to a temperature sufficient to render the fluxing agent active. It may locally even soften the granule surfaces but is insufficient either to vitrify the granule or thoroughly to melt the resulting surface compound, which accordingly becomes adhesive but not fluid. Under these conditions the dust is not only firmly retained upon the surface of the granule by the adhesive surface, but the dust particles, being thus integrated with the granule substance, lose their lighter and duller appearance (characteristic of most powders in contrast to the color of the same materials in consolidated or continuous condition), and the powder is substantially integrated with the granule substance.

Upon cooling the thus treated and roasted granules, their surfaces will retain substantially the original conformation and texture of the freshly fractured raw material. They will also be of uniform color and free from adherent dust, and in especially suitable condition for the purposes of subsequent treatment to impart any desired color thereto. If it is found that such granules are sometimes too dark (especially where a lighter color is to be imparted thereto), they may be lightened in shade by incorporating a light colored or white pigment, such as zinc oxide, with the softening reagent. On the other hand, when a very dark or black granule is required, a dark or black pigment, such as manganese oxide, may be added to the fluxing agent, in a manner similar to the use of zinc oxide for light colored granules. In this case, the light is uniformly absorbed over the granule surface and coloring agents subsequently added are then permitted to develop their true color values, as hereinafter described.

The treated granules as thus obtained may next be coated with a coloring oxide, preferably in as finely a comminuted condition as practical and in relatively small amounts, depending upon the color of the base granule and the degree of coloration desired. This coating may be effected conveniently by mixing the granules and the powder, in dry condition, and then wetting the mixture with water, more firmly to retain the powder upon the granule surfaces as it is handled and fed into the furnace for a second heat treatment. It may sometimes be advantageous, however, to wet the granules and then to add the powdered coloring material, followed by tumbling the mixture. It is also convenient to mix the coloring agent or powder with water first, to form a suitable fluid consistency, and then add it to the granules, which are then mixed so as to distribute the wet coloring matter thoroughly over their surfaces. The granules are then roasted at a temperature sufficient to develop the adhesive condition of the treated surface, whereupon the colored oxide or pigment becomes firmly attached thereto. Both the temperature and atmosphere of the furnace may be further controlled and regulated to determine the ultimate color of the coating. Thereupon the granules acquire the color of the coating, and inasmuch as the softened surface of such granules is highly resistant to weathering, the color of the granules is not only permanent, but the adhesion of the granules to the cementitious surface to which they are subsequently applied is likewise permanent.

While the process of the invention has been described in its preferred form (so far as quality of the resulting product is concerned) as carried out in successive stages of operation, involving separate applications of reagent materials and separate heat treatments, it is to be understood that certain of these steps of operation may be combined. Thus, for example, the raw granules, with or without preliminary washing, may be treated with the dispersed or diluted fluxing agent, then mixed with the finely comminuted coloring agent, and subjected to a heat treatment sufficient to develop the adhesiveness of the flux and to fix the dust and/or coloring matter thereon in a single step,—without vitrifying the granule or fusing the coating. In either case, the granules may be dried after the application of the fluxing reagent, then mixed with the coating material (such as the dust and/or coloring matter) in dry condition, and thereafter moistened to retain the granule coatings in place during handling and until it is finally affixed thereon by the heat treatment. Likewise the raw granules (either with adherent dust or after washing) may be treated with a mixture containing both the flux and coloring agent, in water, and the thus coated granules may then be subjected to a single heat treatment to fix the same and develop the desired color.

It may be here observed that while the raw granules tend to retain a considerable amount of dust, and this naturally adhering dust or additional quantities of the same may be fixed directly to the granules by direct integration as heretofore proposed, the resulting granules tend to be lighter in color but dull owing to the resulting diffusion and saturation of the reflected light. If such dust is washed off, and the washed granules hardened by heat, the inherent color of the granule is developed. But in both cases the variation in colors and shades thus obtainable is definitely limited to that of the raw material. Moreover, the raw granules may be to some extent softened by the washing, thus leading to further disintegration and the formation of additional quantities of dust.

The coating of such loose superficial dust on the granule, either before or after hardening by heat, will tend to obscure both the body colors of the granule and also the color of comminuted coloring matters, which may be added thereto. Moreover, as pointed out above, it is more or less difficult and requires relatively high temperatures to fix the granule dust and the more refractory coloring materials directly to the granule surfaces.

These difficulties of previous practice may be attributable to the lighter color of dusts, as already pointed out, and also to the presence of adsorbed or absorbed air upon and between such particles. Upon heating such dust coated granules, the dust is cushioned away from the granule surface by the air film. Upon heating, the expansion of such film may tend still further to repel the dust particles from the granule.

Upon wetting such dust coated granules, in accordance with the present disclosure, the adsorbed and intervening air is expelled and intimate contact of the dust with the granules is effected. Moreover, even upon subsequent drying, this contact is preserved, first by the surface tension of the water and thereafter, in the presence of a fluxing reagent, by the residual deposit of the same. If the fluxing reagent is applied in the form of a solution, it will be clear that it will be even more finely distributed than the dust, and hence capable of preventing reocclusion of air by the dust. If the temperature of the granules is progressively increased, the tendency toward readsorption of air will be substantially precluded in accordance with well known laws of gas adsorption.

As the temperature approaches that at which the flux becomes active, the flux will itself soften or combine with the fines of the adjacent particles of dust and the resulting already softened composite will wet and contact with the granule surfaces upon which the dust is distributed. Where the reagent thus contacts with the dust particles and/or the granule surface, it may become locally reactive with such surface, either to produce softening at a lower temperature than the granule surface alone may be softened,—owing to the higher melting point and more massive structure of the latter,—or even at a lower temperature than the fluxing reagent, per se, would be softened. Nevertheless, the dispersed fluxing reagent is in a condition especially favorable to its softening and fusing under heat, and thereby presenting isolated centers of softening action upon the surface, but without modifying the structural characteristics of the latter.

Therefore, after cooling the thus treated granules, the granule surfaces will be substantially identical with the original granule, except (1) that they will contain a thin coating or a discontinuous dispersion of isolated, softened, fluxing reagent particles,—in wetting contact with corresponding softened points on the granule,—and (2) that the dust particles will also be severally wetted by and retained upon such softened areas. Such granules will not tend to adsorb air so readily as the raw granules and will appear of darker and more uniform color.

Such treated granules, being substantially free from adsorbed air, may be readily coated with coloring matter, such as refractory metallic oxides. While they may be freely mixed in dry condition, however, the powdered coloring matter may tend to fall off. By wetting the mixture, the powder may be compacted together and upon the granules, similar to the dust. Residual traces of soluble portions of the fluxing reagent (if originally applied in the form of a solution) may contribute to further adhesion of the coloring matter. But between the expulsion of the water and softening of the treated surface, the coloring matter appears to adhere sufficiently. At the higher temperatures of treatment (which are nevertheless considerably below those heretofore required), the particles of coloring matter become firmly adherent to the granule surfaces,—without, however, dissolving therein, and without coalescence of the surface. The granule is thus given any desired color without covering or diluting the coating of coloring material by the other materials present, such as the body color of the granule, granule dust, or fluxing reagent.

Moreover, inasmuch as the fluxed surface of the granule is substantially insoluble and resistant to oxidation and is thus made up of discrete particles or areas, having individual wetting contact or continuity of structure with the body of the granule, without presenting continuity laterally throughout the colored surface,—as exemplified by a glaze coating,—the colored granule obtained in accordance with this invention is substantially free from differential effects of temperature, insoluble and hence substantially permanently resistant to weathering.

The finished granules are, therefore, eminently suitable for application to such surfaces as asphalt or asbestos—cement shingles, cement, molded shapes, plastics, or in other environments where granular materials of such properties are desirable or applicable.

A typical instance of carrying out the invention will be described with reference to the accompanying drawing, in which:

The figure is a vertical cross-section of a multiple hearth furnace suitable for carrying out the heating operations.

A convenient and typical raw material for the purpose of the invention may consist of western Pennsylvania white-burning fire clay or red-burning shales of the Watsontown Valley district in eastern Pennsylvania. The run of mine material is first crushed to the desired size by jaw crushers and rolls or other well known methods, and then screened to separate into the desired size or range of sizes of granules.

The sized granules may next be treated by wetting with a solution of borax in an amount sufficient to impart an extremely thin deposit of borax throughout the granule surface. With granules of approximately ⅛ c. m. or 1⅔ m. m. diameter—or approximately 8 or 10 mesh,—an addition of 1% borax, for example, will provide a deposit on the granules which may be calculated to be approximately .003 to .005 m. m. thick. The greater thickness corresponds to the hydrated salt while the lesser thickness corresponds to the dehydrated salt. The thus treated granules may carry the naturally adherent complement of dust particles or additional dust may be added to them at this stage, if desired. An excessive amount of dust, above that which will tenaciously adhere to the granule, is obviously to be avoided.

The granules as thus treated may be separately dried or may be fed directly in moist condition through the hopper 1 upon the top hearth 2 of a multiple hearth furnace, as shown in the drawing. The accumulated granules are distributed and fed by the rake 3, mounted upon the central shaft 4, rotatably mounted and driven by gears 5, from the center toward the periphery of the hearth where they fall at 6 upon the periphery of the next hearth inside the furnace. The furnace may be provided with openings in the outer walls adjacent to the burners 7 and, also, in the outer walls, with pyrometers 8. By suitable adjustment of the burners and recording of the pyrometer readings (as by indicators not shown but which are well known in the art), the temperatures of the successive hearths may be determined and closely regulated. The inner construction of the central shaft 4 may comprise a central passageway 10 and an outer annular passageway 9, the former having entrances 10' into the arms of the rakes, as shown at 3', and the annular passage 9 being provided with outlets 11 spaced above the several hearths. In this way air may be introduced through the shaft 4 and directed not only through the arms of the rakes 3' to keep them cool, but also over the surfaces of the granular material upon the several hearths to provide a suitable oxidizing atmosphere, and also to insure combustion of the oil introduced from the burners 7.

The granules, if wet, may be substantially dried upon the first outer hearth 2 at the top of the furnace and then are fed successively from hearth to hearth by means of rakes 3, 3', etc., from the center of the first hearth to the periphery whence it falls directly upon the next hearth and is passed from the periphery of the second hearth toward the center by suitable direction of the rakes 3'. The center of the second hearth 12 is provided with an opening at 15 through which the granules fall upon the central portion of the hearth 13 across which they are again directed by rakes (not shown because perpendicular to plane of the drawing) and fall over the periphery of this hearth upon the periphery of hearth 16. In this way granules are passed successively from hearth to hearth over 17, 18, 19, 20, and 21 and finally ejected at 25.

In the first treatment of the granules, if the granule dust which they retain is indifferent to the oxidizing conditions of the furnace with respect to consistency and color, the atmospheric conditions maintained may not be material to the properties of the resulting roasted granules. However, if they contain appreciable amounts of iron oxide, for example, such a control may be desirable at this stage.

The roasted granules may next be treated with a suitable finely comminuted refractory pigment, such as the metallic oxides, namely ferric oxide, chromium oxide, and the like, in such quantities as may be considered necessary to impart the desired color and thoroughly mixed therewith. The dust and granule mixture may then be dampened with water and, after tumbling to insure uniform distribution, returned to the same furnace, as shown in the figure (or one substantially identical therewith), and passed through the hopper 1 and successively across the hearths, as above described in connection with the first treatment. In the second treatment, however, it will usually be desirable more accurately to control the atmospheric conditions of the furnace and usually to insure oxidizing conditions, preferably uniformly at each stage of the treatment; for example, a temperature of 1740° to 1860° F. and a steady current of air through the shaft 4 and passing outwardly through the arms of the rakes, as shown in the rakes 3' at the top of the figure, through the inner passageway 22 and outwardly through the annular passageway 23, and which, if desired, may also have openings 24 into the furnace, or may be directed back into the annular passageway 9 in the shaft 4; and also directly into the furnace chamber above each hearth through passageways 11. The air thus introduced finally emerges at the top of the furnace assisted and controlled in its rate of flow by the fan 27 as well as by the blower 26 at the bottom of the furnace. Excesses of air from the shaft 4 will escape at the top of the furnace at 28.

By this procedure in two stages of operations the raw granules may be first consolidated with their adherent dust and thus rendered more uniform in color and more readily receptive of any additional or different color than in their original raw dust-coated condition. Moreover, when subsequently coated with the coloring material the latter is not mixed with nor diluted by the dust of the granule, and hence it is more effective in masking the natural color of the granule and in imparting its own color thereto. Moreover, inasmuch as the softened granule surface as above described is not only discontinuous, relatively refractory and substantially insoluble in water, the coloring agent is retained upon the granules substantially permanently, and is resistant to the effects of aging and weathering.

In the case of carrying out the fluxing and coating operations with a single burn, this may be effected by first treating the granules with a solution or suspension of flux, and then preferably allowing them to dry, at least partially, and then mixing with the coloring material, moistening, and feeding the thus treated granules directly through the furnace in the same manner as described above, whereupon the granules are first dried and then their surfaces fluxed while both the dust and the coloring material simultaneously become adhesively affixed to the granule surfaces. This order of procedure is more economical of time and labor, and hence may be desirable in some instances, although it is somewhat less efficient with respect to the coloring material required and the purity of color imparted to the finished granule, on account of the admixture of granule dust and coloring matter. With a single burn or heat treatment, as indicated above, the flux and coloring matter may be first mixed with water and thus applied to the granules together, followed by heating the treated granules to the required temperature. Of course if the granules were washed before the application of the coloring material, diffusion of the latter by dust would be substantially overcome.

I claim:

1. Method of making granular materials, comprising as steps reducing a compact argillaceous material, subject to hardening by heat, to the desired size or range of sizes, treating the same with a softening agent in dilute solution, drying to disperse a thin coating upon the granule surfaces, and heating to harden the granules and to render the softening agent effective upon the treated surfaces, mixing the granules with refractory coloring materials in finely comminuted condition, and heating to a temperature sufficient to soften the treated surfaces.

2. Method of making granular materials, comprising as steps reducing a compact argillaceous material, subject to hardening by heat, to the desired size or range of sizes, treating the same with a softening agent in dilute solution, drying to disperse a thin coating upon the granule surfaces, and heating to harden the granules and to render the softening agent effective upon the treated surfaces, mixing the granules with refractory coloring materials in finely comminuted condition, and heating to a temperature sufficient to soften the treated surfaces and to integrate the coloring materials therewith.

3. Method of making granular materials, comprising as steps reducing a compact argillaceous material, subject to hardening by heat, to the desired size or range of sizes, treating the same with a softening agent in dilute solution, drying to disperse a thin coating upon the granule surfaces, and heating to harden the granules and to render the softening agent effective upon the treated surfaces, mixing the granules with refractory coloring materials in finely comminuted condition, and heating to a temperature sufficient to soften the treated surfaces, and under predetermined atmospheric conditions to control the color of the coloring agent.

4. Method of making granular materials, comprising as steps reducing a compact argillaceous material, subject to hardening by heat, to the desired size or range of sizes, treating the same with a softening agent in dilute solution, drying to disperse a thin coating upon the granule surfaces, heating to harden the granules and to render the softening agent effective upon the treated surfaces, mixing the granules with refractory coloring materials in finely comminuted condition, heating to a temperature sufficient to soften the treated surfaces, and under predetermined atmospheric conditions to control the color of the coloring agent, and retaining the angular fracture of the raw argillaceous material.

5. Method of making granular materials, comprising as steps reducing a compact argillaceous material, subject to hardening by heat, to the desired size or range of sizes, treating the same with a softening agent in dilute solution, drying to disperse a thin coating upon the granule surfaces, and heating to harden the granules and to render the softening agent effective upon the treated surfaces, mixing the granules with refractory coloring materials in finely comminuted condition, and heating to a temperature sufficient to soften the treated surfaces, and under predetermined atmospheric conditions to control the color of the coloring agent, and retaining the rough surface and angular fracture of the raw argillaceous material.

6. Method of making granular materials, comprising as steps reducing a compact argillaceous material, subject to hardening by heat, to the desired size or range of sizes, treating the same with a solution of borax, drying to disperse a thin coating upon the granule surfaces, heating to harden the granules and to render the borax effective upon the treated surfaces, mixing the granules with refractory coloring materials in finely comminuted condition, and heating to a temperature sufficient to soften the treated surfaces.

7. Method of making granular materials, comprising as steps reducing a compact argillaceous material, subject to hardening by heat, to the desired size or range of sizes, treating the same with a solution of borax, drying to disperse a thin coating upon the granule surfaces, heating to harden the granules and to render the borax effective upon the treated surfaces, mixing the granules with refractory coloring materials in finely comminuted condition, heating to a temperature sufficient to soften the treated surfaces and to integrate the coloring materials therewith.

8. Method of making granular materials, comprising as steps reducing a compact argillaceous material, subject to hardening by heat, to the desired size or range of sizes, treating the same with a solution of borax, drying to disperse a thin coating upon the granule surfaces, heating to harden the granules and to render the borax effective upon the treated surfaces, mixing the granules with refractory coloring materials in finely comminuted condition, heating to a temperature sufficient to soften the treated surfaces, and under predetermined atmospheric conditions to control the color of the coloring agent.

9. Method of making granular materials, comprising as steps reducing a compact argillaceous material, subject to hardening by heat, to the desired size or range of sizes, treating the same with a solution of borax, drying to disperse a thin coating upon the granule surfaces, heating to harden the granules and to render the borax effective upon the treated surfaces, mixing the granules with refractory coloring materials in finely comminuted condition, heating to a temperature sufficient to soften the treated surfaces and under predetermined atmospheric conditions to control the color of the coloring agent, and retaining the angular fracture of the raw argillaceous material.

10. Method of making granular materials, comprising as steps reducing a compact argillaceous material, subject to hardening by heat, to the desired size or range of sizes, treating the same with a solution of borax, drying to disperse a thin coating upon the granule surfaces, heating to harden the granules and to render the borax effective upon the treated surfaces, mixing the granules with refractory coloring materials in finely comminuted condition, heating to a temperature sufficient to soften the treated surfaces and under predetermined atmospheric conditions to control the color of the coloring agent, and retaining the rough surface and angular fracture of the raw argillaceous material.

CLARENCE L. COLBERT.